[19] United States Patent
Kuan

[11] 4,340,104
[45] Jul. 20, 1982

[54] DEFLATED TIRE LUBRICANT

[75] Inventor: Tiong H. Kuan, Stow, Ohio

[73] Assignee: The General Tire & Rubber Company, Akron, Ohio

[21] Appl. No.: 134,832

[22] Filed: Mar. 28, 1980

Related U.S. Application Data

[63] Continuation of Ser. No. 920,673, Jun. 30, 1978, abandoned.

[51] Int. Cl.$^3$ .......................... B60C 17/00; B60C 5/12

[52] U.S. Cl. ................................ 152/330 L; 152/347; 252/51.5 A; 252/56 R; 252/56 S

[58] Field of Search ............... 152/152, 330 R, 330 L, 152/330 RF, 347, 374; 156/115; 252/51.5 A, 56 S, 56 R

[56] References Cited

U.S. PATENT DOCUMENTS

| | | | |
|---|---|---|---|
| 2,040,645 | 5/1936 | Dickinson | 152/330 R |
| 3,299,934 | 1/1967 | Pace | 152/354 |
| 3,392,772 | 7/1968 | Powers | 152/158 |
| 3,394,751 | 7/1968 | Sidles et al. | 152/330 R |
| 3,421,566 | 1/1969 | Sidles et al. | 152/330 R |
| 3,610,308 | 10/1971 | McDonald | 152/158 |
| 3,739,829 | 6/1973 | Powell et al. | 152/330 R |
| 3,850,217 | 11/1974 | Edwards et al. | 152/330 RF |
| 3,931,843 | 1/1976 | Edwards et al. | 152/330 L |
| 4,045,362 | 8/1977 | Kuan et al. | 252/14 |
| 4,057,092 | 11/1977 | Tracy | 152/379.1 |
| 4,096,898 | 6/1978 | Mosserly et al. | 152/330 L |

*Primary Examiner*—John E. Kittle

[57] ABSTRACT

To facilitate relative movement between the internal surfaces of a pneumatic tire which come into contact when the tire is run in a deflated condition, the interior of the tire is coated with a lubricant which does not flow at normal tire operating temperatures. The matrix of the lubricant is a polyester, polyurea or polyurethane which does not begin to flow until the tire reaches a temperature of from 65° C. to 150° C. If the lubricant were allowed to flow at operating temperatures, it would adversely effect the balance and performance of the tire. The high tire temperature indicates that the tire is flat and reduces the viscosity of (liquifies) the lubricant causing it to flow. The lubricant then reduces rubbing friction and temperature rise which would otherwise occur by rubber-to-rubber contact. The lubricated tire can be run flat to a service station.

4 Claims, 2 Drawing Figures

DEFLATED TIRE LUBRICANT

This is a continuation of application Ser. No. 920,673 filed June 30, 1978, now abandoned.

BACKGROUND OF THE INVENTION

1. Field of the Invention

This invention relates to lubricants for pneumatic tires for vehicles and specifically to a lubricant for a tire running while deflated or underinflated.

2. Description of the Prior Art

A basic problem with all pneumatic tires is that they occasionally become underinflated or completely deflated and when this occurs, the tire must be changed and a spare tire put on. In some cases, a blowout can cause the vehicle to go out of control.

A tire which can be run flat has, for some time, been a desirable objective in the tire-making art. If a tire could be run flat for an appreciable distance, the driver could run on the flat tire until a replacement tire was obtained or the tire repaired. This would eliminate changing tires on the road and dependence on a spare. A driver could also run on the suddenly deflated tire until a safe place to stop the car is found, thus avoiding sudden stopping on crowded streets and highways.

There are many problems associated with running a conventional tire flat. A flat tire is unstable, making steering difficult. The lack of inflation pressure causes the tire beads to unseat, and eventually the tire may come off the wheel rim. In addition, riding with a flat tire can be an uncomfortable experience since there is practically no cushion between the wheel rim and the road surface.

A number of designs have been proposed to increase the stability and rideability of the tire when deflated or flat. Some of these proposals, such as U.S. Pat. Nos. 3,394,751 and 3,421,566 relate to movable sidewalls so that the tire tread force is communicated directly to the rim. U.S. Pat. No. 4,057,092 relates to a circumferential locking lug. Other proposals, such as U.S. Pat. Nos. 2,040,645; 3,392,772 and 3,610,308 have special units in the interior of the tire. Other proposals include liquid lubricants within the tire, (U.S. Pat. No. 4,045,362) and solid lubricants which liquify on the addition of chemicals (U.S. Pat. No. 3,931,843).

A problem generated by tires running flat is the friction which develops from the upper and lower portions of the deflated sidewall rubbing against each other. The friction produces excess heat and causes the sidewalls to wear excessively. To reduce this friction, the inclusion of either liquid or solid lubricants on the tire interiors has been proposed. U.S. Pat. No. 2,040,645, for instance suggests a graphite lubricant, U.S. Pat. No. 3,610,308 mentions the use of liquid silicone, and U.S. Pat. Nos. 3,739,829; 3,850,217 and 4,045,362 describe the use of polyalkylene glycols, glycerol, propylene glycol, silicone and other lubricants. The liquid lubricants, however, are not evenly distributed in the operating tire and can adversely effect balance and tire performance. Solid lubricants which liquify at flat tire temperature are also known but they require a chemical reagent for liquification (U.S. Pat. No. 3,931,843).

SUMMARY OF THE INVENTION

Friction reducing capability is not the only important characteristic to be considered in designing a lubricant for use in run-flat tires. Other important parameters should include viscosity (hence mobility) and the ability to transfer heat. For the heat sensitive lubricants, the temperature at which drastic reduction in viscosity starts to occur is also an important factor.

An alternative to lubricants is one which behaves like a flexible solid at ordinary service temperatures but melts into a liquid when heated above a certain critical temperature. The advantages of such a "phase"-changeable lubricant are numerous. Foremost of all, its presence in the tire maintains tire balance if distributed properly. The lubricant is stable dimensionally so that its presence in the tire does not pose any undue difficulty in handling, either during mounting, shipping or storage.

Although a chemically cross-linked network generally implies a three-dimensional structure which does not melt or flow on heating, it is possible to make one which does. The latter should not be confused with thermoplastic materials. Most thermoplastic materials are linear in structure and can be made to soften and take on new shapes by the application of heat and pressure.

The formation of a reversible network depends very much on the type of materials used. Suitable materials are polymers whose molecular chains are held together either by strong but thermo-labile van der Waals forces including hydrogen bonds, temperature dissociable chemical cross-links or combination of these. The molecular weight of the linear chains should be above the critical level in which entanglements (physical cross-links) become important.

Polyurethanes are examples. A reversible network can be made of the appropriate urethane materials in which all of the three molecular forces or bonds are known to exist. The temperature dissociable and reformable chemical cross-links are the biuret and allophonate linkages. Another desirable feature of a polyurethane based network is the inherent lubricity of the chemical intermediates (e.g. polypropylene glycol and other diols) used for the polymerization. When melted, a typical polyurethane based on polypropylene glycol will act as a natural lubricant. The temperature at which the network breaks down can be controlled primarily by the types of urethane intermediates and chain extenders used.

The lubricant of the present invention is essentially non-flowable at normal tire operating temperatures so that it does not adversely effect tire operation, but becomes liquid-like at flat tire temperature and lubricates the flat tire to allow the tire to be driven twenty-five miles or so for service. The lubricant which is used as a coating or matrix on the interior surface of the tire is selected from the group consisting of polyether polyurethane, polyester polyurethanes, polyesters and polyureas (polyether and polyesters). The coating matrix does not begin to flow on the surface of the tire until the tire reaches a temperature between 65° C. to 150° C. Preferably the coating matrix does not begin to flow until the tire reaches a temperature of from 80° C. to 120° C.

The preferable coating matrix from the standpoint of non-flowability at normal service conditions and lubricity is the polyurethane, either based on polyether or polyester.

The coating matrix may be used alone or can contain additional liquid lubricants such as polyglycols or can contain solid lubricants such as polyethylene or graphite forming a mixture. The coating matrix can also contain rolling microbeads which is the subject of co-pending application Ser. No. 33,652

DESCRIPTION OF THE PREFERRED EMBODIMENT

Figure 1:
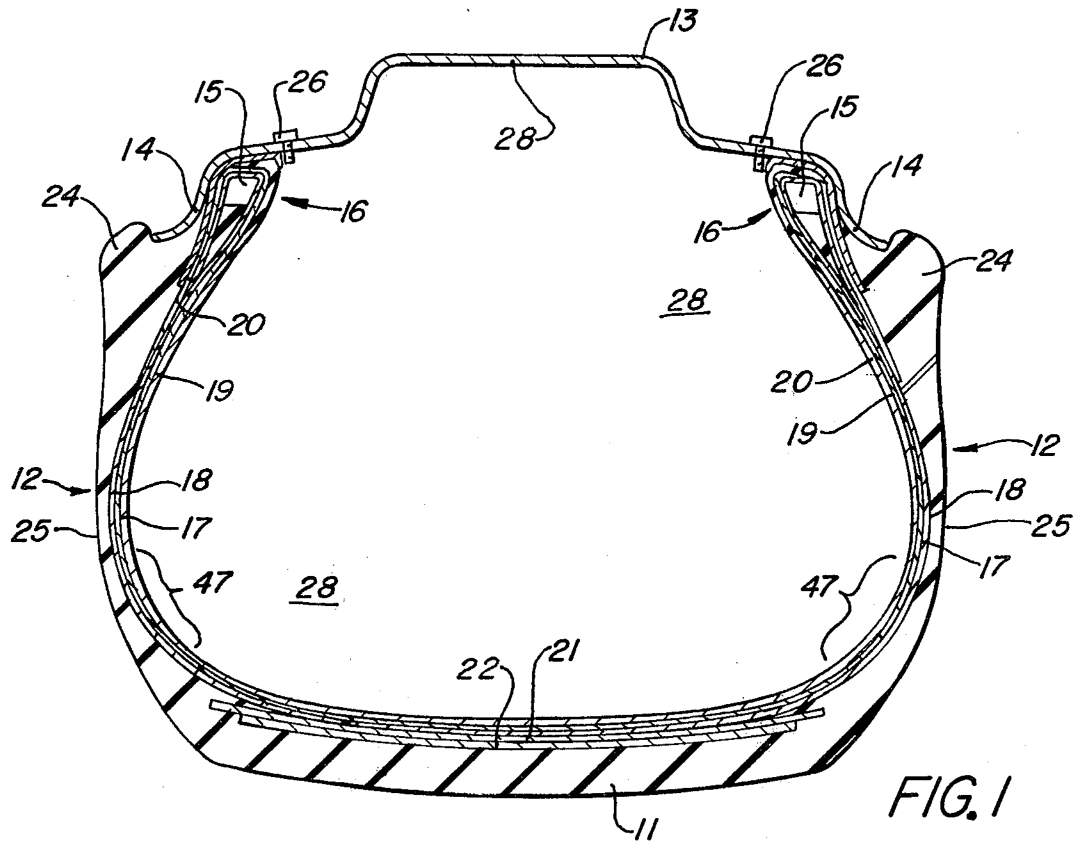
FIG. 1 is a sectional view of a tire of the present invention.

Referring to FIG. 1, there is shown a pneumatic tire. The tire has a thick tread portion 11 which extends circumferentially around the tire, and sidewalls 12 which extend from the tread portion along the sides of the tire. The tire is designed to be mounted on a conventional wheel rim 13 which has at its outer edges outwardly flared flanges 14 also of conventional design. Wire bead rings 15 are provided in the bead portion 16 of the tire where the sidewall meets the rim 13. In accordance with conventional tire construction, the beads are designed to keep the tire on the rim when the tire is inflated. The inflation pressure of the tire forces the beads 15 against the flange 14, keeping the tire on the rim and maintaining tire inflation.

The tire shown in the drawing may be of the conventional bias/belted but is preferably of the belted radial type. These tires have two bias or radial plies 17 and 18 extending around the interior of the tire. The plies extend from bead-to-bead and are folded around the bead rings 15 so that the ends 19 and 20 of the plies are located in the sidewall region. There are also two steel or fabric belts 21 and 22 extending circumferentially around the interior of the tire and located directly interior to the tread portion 11. Conventional rubber compositions are used to form the tread and sidewall portions of the tire and the air-retaining inner liner.

A feature of this particular tire is the combination of the circumferential locking lug 24 and machine screws 26. The lug results from a specially designed increase in the thickness of the sidewall at the end of the rim flange as shown. The locking lug 24 does not interfere with the normal characteristics of the tire when inflated. Upon deflation, however, the locking lug 24 wraps around the flange 14 to secure the tire to the rim 13. Machine screws 26 also prevent the tire bead from falling into the rim well. Thus, the deflated or flat tire is secured to the rim allowing the tire to be driven flat for a period of time.

The drawing illustrates a size BR78-13 SBR tubeless tire mounted on a standard rim, and it will be understood that a larger tire, such as size HR78-15 could have about the same shape. The rubber used in the tire can be the same as used in conventional tires, in which case the rubber of the sidewall portions could be an SBR with a Shore A durometer hardness in the range of 40 to 80. Butyl rubber can be used in the inner liner to provide maximum resistance to gas permeation.

It is preferable to provide the lubricant matrix 16 on the interior surface of the sidewall portions 28, particularly at 47 to reduce the friction and heat generated by the rubbing of the upper and lower halves of the sidewalls when they are in contact during operation of the deflated collapsed tire. The liquified solid lubricant matrix 16 employed has excellent lubricity when hot. The lubricant matrix has a nonflow stability which is maintained as the temperature is increased to 65° C. The lubricant matrix 16 is also stable and remains in place in the tire when operated for long periods of time.

The solid lubricant matrices 16 preferred for use in the present invention have excellent lubricity, are compatible with the rubber of the inner liner of the tire, are stable and operable over a wide range of temperatures and shear rates, have a non-flow property such that the lubricant matrices remain uniformly distributed during normal use of the tire, have puncture-sealing capability, particularly when fibrous materials are added, and aid in air retention of the tire in normal use, particularly when the entire inner surface of the tire is coated with a lubricant matrix.

Prior to this invention, there were no solid lubricants which remained in place during normal tire use, but which liquified due to heat when needed and adequately lubricated the tire. The lubricant matrices as disclosed hereinafter meet all of the requirements set forth in the previous paragraph.

The lubricant matrices of this invention comprises high molecular weight polymeric materials which are non-flowable, high viscosity, solid-like materials at normal tire operating temperatures but which become liquid-like at the elevated temperatures generated by flat tires. The solid-like state of the matrices is probably due to hydrogen bonding intermolecular interactions including chemical reaction between adjacent polymer molecules, physical cross-links or entanglements and/or the combined. For example, the polyurethane lubricant matrix probably both forms hydrogen bonds between adjacent molecules and also chemically reacts to form allophonate cross-links between the isocyanate and the urethane linkages. Both the hydrogen bonds and the allophonate cross-links are relatively weak and break down at elevated temperatures generated in a flat tire resulting in the lubricant matrix forming a liquid lubricant.

Polyurethane actually covers a wide variety of materials with polyethers and polyesters being the most commonly used. Strictly speaking, polyurethane applies only to the reaction product formed between an isocyanate-containing material and a hydroxyl-containing material. Polyureas, on the other hand, are formed from the reaction between an isocyanate-containing material and an amine-containing material. The functionality of the latter reacting species should be at least two or greater in order for polymerization, chain extension and/or cross-linking to occur. The isocyanate-containing material can be either in the form of a polyether-based prepolymer such as duPont's Adiprene LW-510 (a hexamethylene diisocyanate terminated polytetrahydrofuran) or a polyester-based prepolymer such as Uniroyal's Vibrathane system (a diphenylmethane diisocyanate-terminated polyester) or simply a low molecular weight diisocyanate.

The hydroxy-containing materials can likewise be either a low molecular weight diol such as butanediol, or a high molecular weight polyether polyol (e.g. Dow's Polyglycol 2000 and 4000) or polyester polyol (e.g. like that used in Mobay's Multrathane system). Examples of trifunctional polyols include trimethylol propane and Dow's Voranol 3000.

The more commonly used amines are difunctional and have low molecular weight. Examples include duPont's MOCA (2,2'-dichloro-4,4'-diamino diphenylmethane) and MT Chemicals' Apocure 601E (1,2-bis(2-aminophenyl)thioethane).

The type of chemical cross-links formed depends on the nature of the secondary reactions. The reaction between an isocyanate and a urethane linkage results in an allophonate cross-link. The reaction between an isocyanate and a urea linkage, on the other hand, forms a biuret cross-link.

The polyester lubricant matrix is solid containing crystalline particles which turns to a liquid when the melting temperature of the crystalline particles is reached and therefore causes more lubricant matrix flow problems. Due to this flow problem, it is not contemplated that the polyester matrix will be the preferred material where non-flow is a criteria. The polyester matrix, it is contemplated, is a superior lubricant to the polyurethane and in those situations where 50 to 100 run flat miles are contemplated is the preferred lubricant. Higher melting crystalline materials are available which can be used to achieve the non-flow requirements of the polyester lubricant during normal service conditions.

The lubricant matrices can also contain very small amounts of antioxidants, polyolefin lubricants, polyether lubricants, hydrocarbon wax lubricants, graphite, and other liquid and solid lubricants and small amounts of other ingredients commonly employed in run-flat tires. They preferably contain cellulose fibers or other suitable filler in an amount such as 3 to 8% by weight and preferably 4 to 6% by weight. The fibrous filler may comprise fibers with a length from 20 to 400 microns.

Solka Floc fibers are made by Brown Company and comprise cellulose fibers. One type of fiber is about 100 microns long and about 16 microns thick. Another type of fiber is about 50 microns long and about 17 microns thick.

In addition to favorably affecting the rheological behavior of the lubricant, the addition of the fibers imparts puncture-sealing capability to the lubricant. The fiber containing lubricant can, in some instances, successfully seal a puncture in a tire resulting from a nail. Leakage of air can, in other instances, occur upon puncturing with nails; however, the puncture sites become covered with small amounts of the lubricant, and leakage is reduced.

EXAMPLE I

Polyurethane Matrix Based Lubricant

Polyurethanes can be made to cross-link by either allophonate or biuret branching or by the use of multifunctional chain extender. The allophonate and biuret cross-links can dissociate on heating which leads to a reduction of viscosity. A typical polyurethane-paraffin wax lubricant is shown below in Table I.

TABLE I

Heat Sensitive Polyurethane Lubricant (Lube I)

| | Parts By Weight |
|---|---|
| Adiprene LW510 | 100 |
| Ionol antioxidant | 0.5 |
| X2-3107 silicone | 1.0 |
| Polyglycol P4000 | 106.7 |
| Polyglycol P2000 | 55.2 |
| T-12 catalyst | 0.2 |
| Paraffin wax, ~70° C. MP | 10.0 |
| Paraffin wax, ~105° C. MP | 100 |
| Plurafac D-25 | 10.0 |
| Total | 383.6 |

The above components are mixed and heated to about 100° C. for one hour.

X2-3107 is a non-reactive silanol terminated dimethyl siloxane containing 8% xylene. Polyglycols P4000 and P2000 are difunctional polypropylene glycols of molecular weight 4000 and 2000, respectively. Plurafac D-25 is a polyethylene oxide-polypropylene oxide copolymer surfactant. The above lubricant is a high viscosity, flexible solid over a temperature range from room to about 75° C. Upon heating above 50° C., the lubricant will undergo gradual reduction in viscosity until it becomes a mobile fluid at temperatures above 100° C. Run flat mileage exceeding the minimum requirement (25 miles at 25 mph) has been obtained with the use of this lubricant.

The melting point should be more appropriately referred to as the temperature of liquefaction. It is the temperature at which the network lubricant is transforming into a highly mobile liquid. Most of the lubricants examined started to soften at the least 20° below the liquefication temperature. The present melting point measuring device (Fisher Jones Co.) does not permit an exact softening and liquifying temperature to be measured. Hence, the liquifying temperatures listed are only approximate, to perhaps ±10° C.

The prepolymer used in this development work is chosen by convenience and availability. The polyols are chosen because of their known lubricity. X2-3107 is a non-reactive silicone fluid containing about 8% xylene. It is added in the lubricant to improve flow and lubricity. CAB-O-SIL fumed silica in formulation, imparts thixotropy to the lubricant and thus, facilitates coating.

EXAMPLE I(A)

An example of a basic polyurethane lubricant is shown below.

| Ingredients | Trade Name Manufacturer | Parts |
|---|---|---|
| Polyether containing 4.25% available NCO | Adiprene LW510 (duPont) | 100 |
| Difunctional polypropylene | Polyglycol | |
| MW 4000 | P4000 (Dow) | 105 |
| MW 2000 | P2000 (Dow) | 55 |
| Silicone | X2-3107 (Dow Corning) | 5 |
| Dibutyltin dilaurate catalyst | T-12 (M&T) | 0.2 |
| 2,6 Di-t-butyl-4-methyl phenol | Ionol (Harwick) | 0.5 |
| | Total | 265.7 |

This particular lubricant starts to soften at around 150° F. (65° C.) but it does not become a mobile liquid until the temperature reaches about 250° F. (125° C.). When this lubricant was added in the interface between two sliding rubber surfaces, friction was significantly reduced as evidenced by the results shown below:

| Sliding Components | Frictional Force* (grams) | Approx. Contact Stress mPa | Apparent Coefficient of Sliding Friction |
|---|---|---|---|
| Rubber-on-rubber (dry) | (20210) | 0.74 | 1.8 |
| Rubber-on-rubber in the presence of the lubricant (Ex. IA) | | | |
| (a) thin film | (11285) | | 1.0 |

-continued

| Sliding Components | Frictional Force* (grams) | Approx. Contact Stress mPa | Apparent Coefficient of Sliding Friction |
|---|---|---|---|
| (boundary) | | | |
| (b) thick film (hydro-dynamic) | (8660) | | 0.8 |

*Calculated from the torque required to maintain sliding of one rubber substrate on top of the other. The modified Brabender plasticorder was used for the above friction measurement. Other conditions of the test follow: sliding speed = 115 rpm (23 cm/sec); normal load = 10980 gm.

Over more than two hours of continuous sliding, the temperature of the dry rubber substrates increased by at least 39° C. while the lubricated rubber substrates increased only by about 14° C. The presence of the lubricant prevented abrasion of the rubber surfaces. Without the lubricant, abrasion was excessive.

Other unique properties, aside from lubricity, that the lubricant possesses include non-volatility, dimensional stability and inertness toward the tire materials. Due to its dimensional stability, a run flat tire which is coated with the lubricant can be mounted in the conventional way. The coated lubricant has no adverse effect on the running characteristics of the inflated tire, i.e., minimal vibration during running. The viscosity and slight tackiness of the lubricant also imparts puncture sealing capability of the tire.

Radial tires whose innerliner surfaces were coated with the lubricant have been run-flat tested. The run-flat test results show a capability of 29.5 run-flat miles*.

*Test Conditions

Method = pulley wheel
Speed = 25 mph
Load = 35.6 kg (80% rated)
Rim width = 11.4 cm
Bead lock = rim well band

EXAMPLE II

Polyester Matrix Based Lubricant

Synthesis and Thermal Analysis

This lubricant is prepared by blending paraffin waxes of different melting points into an esterification product of a polycarboxylic acid and a polypropylene glycol diol. Calcium stearate, mineral oil, and certain low molecular weight liquid polyolefins (e.g., polyisobutylene rubber, hydroxyl terminated polybutadiene) are added for viscosity and rheological modifications. To improve mixing between the paraffins and the various polar materials, surfactants (e.g., Pluronics, silicones) are used. Typical formulations and a description of the materials used are shown in Tables II and III, respectively.

TABLE II

| Lubricant Examples | HEAT SENSITIVE POLYESTER-BASED LUBRICANT II | III | IV | V | VI |
|---|---|---|---|---|---|
| PPG 2025 | 100 | 100 | 100 | 100 | 25 |
| Emolein 2901A | 91.2 | 91.2 | 91.2 | 91.2 | 22.8 |
| AFAX LR285 | — | 20 | — | — | — |
| R-45 HT | — | — | 20 | — | — |
| Vistanex LM—MS | — | — | — | 20 | — |
| Ionol | 0.5 | 0.5 | 0.5 | 0.5 | 0.2 |
| Mineral Oil | 60 | 60 | 60 | 60 | 40 |
| Calcium stearate | 45 | 45 | 45 | 45 | 25 |
| Paraffin wax MP 215 | 35 | 35 | 35 | 35 | 30 |
| Carnauba wax | 1.5 | 1.5 | 1.5 | 1.5 | 2.5 |

TABLE II-continued

| Lubricant Examples | HEAT SENSITIVE POLYESTER-BASED LUBRICANT II | III | IV | V | VI |
|---|---|---|---|---|---|
| TX619 | 1.0 | 1.0 | 1.0 | 1.0 | 2.5 |
| Pluronics L61 | 0.5 | 0.5 | 0.5 | 0.5 | 1.5 |
| Pluronics L81 | 2.5 | 2.5 | 2.5 | 2.5 | 5.0 |
| Pluronics L101 | 1.0 | 1.0 | 1.0 | 1.0 | 3.5 |
| X2-3107 | 2.0 | 2.0 | 2.0 | 2.0 | 1.5 |
| Cab-O-Sil | | | | | 4 |
| Total | 340.2 | 360.2 | 360.2 | 360.2 | 159.5 |

TABLE III

| Materials | Description |
|---|---|
| MATERIALS FOR POLYESTER-BASED LUBRICANT | |
| PPG 2025 | Polypropylene glycol of molecular weight 2025 |
| Emolein 2901A | Polycarboxylic acid based on a $C_{18}$ fatty acid |
| R-45 HT | Hydroxyl-terminated polybutadiene with an approximate molecular weight of 2000 |
| Vistanex LMMS | Low molecular weight liquid polyisobutylene |
| Ionol | 2,6 Di-t-butyl-4-methylphenol, MP = 70° C. |
| TX619 | Low molecular weight paraffin wax MP = 83.7-98.7° C. |
| Pluronics L61, L81, L101 | Copolymers of 10/90 poly(oxyethylene)-poly(oxypropylene) with total molecular weight of approximately 2000, 2500 and 3600, respectively |
| X2-3107 | Non-reactive silicone containing 8% xylene |
| AFAX LR285 | "Amorphous" polypropylene, MP = 124.6-164.8 |

In the synthesis of the polyester-based lubricant, the waxes were first pre-melted in separate containers and then added together with the Pluronics and silicones to the partially esterified PPG 2025/Emolein 2901A. The PPG 2025/Emolein (2:1 molar ratio) esterification process was carried out at temperatures above 150° C. for half an hour or more. After the wax and the ester had been thoroughly blended, the calcium stearate/mineral oil mixture was then finally added with vigorous stirring to form a thick paste lubricant. Cab-O-Sil fumed silica, when needed, was added last. Results of the thermal analysis (DTA) of the lubricants are shown in Table IV. The analysis was done on duPont's Macrocell Thermal Analyzer using glass beads as the reference. Measurements were done first by heating the sample to as high as 160° C. at a rate of 20° C./min. followed by quenching at the same rate. The melting temperatures given in Table IV represent the average values taken from both the heating and cooling cycles.

TABLE IV

| Lubricant | DIFFERENTIAL THERMAL ANALYSIS OF POLYESTER-BASED LUBRICANTS Tm (°C.) Peak | Range |
|---|---|---|
| II | 110.8 | 105.0–118.7 |
| III | 112.5 | 101.8–122.0 |
| IV | 111.9 | 105.4–122.0 |
| V | 112.0 | 109.4–119.5 |

When a flat occurs, the temperature of the tire can easily rise above 100° C. within 10 minutes at 25 mph. It is therefore desirable for the lubricant to melt to a low viscosity fluid at about 100° C. for effective lubrication. A lubricant with a relatively low melting temperature would flow and affect the dynamic balance of the tire adversely. On the other hand, a lubricant having too high a melting temperature would not function properly when needed. Lubricants II through V started to melt at around 100° C. which appears to be a desirable region.

VISCOSITY MEASUREMENT

The viscosities of the lubricants above their melting points were determined using a Haake/Rotating viscometer. The results showing the effect of shear rate on viscosity at 125° C. are summarized in Table V.

TABLE V

EFFECT OF SHEAR RATE ON VISCOSITY OF POLYESTER-BASED LUBRICANT

| Lubricant | II | III | IV | V | VI* |
|---|---|---|---|---|---|
| Shear Rate $sec^{-1}$ | Viscosity, centipoises | | | | |
| 88.2 | 22.7 | 18.1 | 18.1 | 40.8 | 294.8 |
| 176.3 | 20.4 | 18.6 | 17.0 | 32.2 | 238.1 |
| 264.5 | 19.4 | 18.1 | 16.6 | 30.2 | 176.9 |
| 529.0 | 22.5 | 18.9 | 20.4 | 32.9 | 88.5 |

*Measured at 140° C.

All the above measurements were done using an MV-2 rotor. MV-2 designates a particular type of rotor and beaker set-up used in conjunction with the Haake viscometer. This particular rotor has a hollow bottom and its diameter and height dimensions are 36.8 mm and 60 mm, respectively. With the exception of lubricant VI, the constancy of viscosity over the shear rate range studied is rather surprising and resembles that of a Newtonian liquid.

VOLATILITY STUDY

The volatility of the polyester-based lubricants was measured in terms of the percent weight loss on heat aging at 105° C. up to a period of one week. Results of the aging study are summarized in Table VI.

TABLE VI

VOLATILITY OF POLYESTER-BASED LUBRICANTS

| Lubricant | II | III | IV | V | VI |
|---|---|---|---|---|---|
| Time of aging (days) | Cumulative Weight Loss (%) | | | | |
| 1 | 5.9 | 5.8 | 2.5 | 7.8 | 5.8 |
| 3 | 9.3 | 15.9 | 8.9 | 11.5 | 15.8 |
| 5 | 12.3 | 17.7 | 11.6 | 17.7 | 24.3 |
| 7 | 16.8 | 23.2 | 15.2 | 22.1 | 30.5 |

Lubricant IV is the least volatile. Close examination of this aged sample shows that a layer of film was deposited on top of the lubricant. The film is relatively tough and is probably formed from the oxidation of the liquid polybutadiene. The formation of the film probably minimizes further volatilization.

FRICTION MEASUREMENTS

An effective lubricant should significantly reduce sliding friction between rubber surfaces inside the runflat tire. The ability of the lubricants to reduce friction was characterized using a modified Brabender Plasticorder. The device, shown in FIG. 2, has reproducibility to within ±15%.

The conversion (FIG. 2) of the commercial Brabender Plasticorder into a friction measuring device involved the following modifications.

(1) The two cam-type rotors were replaced with a single flat surface rotor 50. The rubber specimen 51 whose friction coefficient is to be measured is molded on a metal ring 52. The ring, 2.54 cm ID×2.54 cm wide×0.635 cm thick (half of which consists of the rubber), fits snugly onto the rotor.

(2) The center-jacketed mixing chamber was replaced with a non-jacketed asbestos insulated steel chamber 54 of different configuration. The temperature of the chamber can be controlled. Besides, the chamber serves as a reservoir for the lubricant.

(3) The conventional ram and loading chute assembly was replaced by one supported by linear bearings to minimize friction.

The slider, added to the Brabender, fits onto and pivots freely around the left supporting rod 58 used to hold the conventional mixing chamber. The slider contains a 6.35 cm×1.27 cm×0.635 cm groove 60 which holds the flat rubber specimen 62.

The damping device on the plasticorder is disconnected when friction measurements are made to obtain faster response. The modifications were made in such a way that changing from conventional Brabender torque measurements to rubber friction measurement can be completed in less than 10 minutes.

When a flat tire occurs, the bead wrap comes into contact with the crown portion of the sidewall. The bead wrap is much stiffer due to the presence of the beads and the higher hardness of the bead compound. In order to approximate this condition in the laboratory, two compounds of different hardnesses were used for friction measurements. The two compounds are essentially identical except in the amount of carbon black used, as shown in Table VII.

TABLE VII

RUBBER COMPOUNDS* USED FOR FRICTION STUDY

| Compound Ingredients | I phr | II phr |
|---|---|---|
| Chlorobutyl HT1068 | 60 | 60 |
| RSS #1 | 10 | 10 |
| SBR 1502 | 30 | 30 |
| Maglite D | 0.5 | 0.5 |
| HAF Black | 40 | 113.3 |
| Soft clay | 40 | 40 |
| Flexon 840 | 10 | 10 |
| Amberol ST137 | 4 | 4 |
| Stearic acid | 1 | 1 |
| Zinc Oxide | 5.0 | 5.0 |
| MBTS | 1.25 | 1.25 |
| Vultac 3 | 1.25 | 1.25 |
| Totals | 203.0 | 276.3 |

*Enjay Chlorobutyl formulary #25.004

The materials used in Table VII are:

Chlorobutyl HT-1068: contains 1.2% by weight of chlorine in an isobutylene/isoprene rubber; the level of unsaturation is about 1.4%, ML 1+8 @100° C.≈50, specific gravity=0.92 (Exxon Co.).

RSS #1: natural rubber as smoked sheet

SBR 1502: a styrene-butadiene rubber with 23.5% bound styrene and ML 1+4 @100° C.=52 (General Tire)

Maglite D: magnesium oxide, used as vulcanizer and activator (C.P. Hall).

Flexon 840: a paraffinic based petroleum oil (Exxon Chemical)

Amberol ST 137: a phenol formaldehyde resin used primarily as cross-linker for the chlorobutyl rubber (Rohm and Haas)

| | Properties I | Properties II |
|---|---|---|
| Shore A | 62 | 86 |
| 5% Modulus, psi (MPa) | 25 (0.19) | 130 (0.96) |
| 10% Modulus, psi (MPa) | 50 (0.38) | 185 (1.3) |
| 100% Modulus, psi (MPa) | 280 (1.9) | 965 (6.7) |
| 300% Modulus, psi (MPa) | 840 (5.8) | — |
| Tensile, psi (MPa) | 1690 (11.6) | 1315 (9.1) |
| % Elongation | 550 | 150 |
| Tear Trouser, pli (kN/m) | 31 (5.5) | 19 (3.3) |

Compounds I and II are hereby referred to as soft and hard compounds, respectively. Although friction measurements have been done using various combinations of rubber pairing (i.e. hard/soft, soft/hard, hard/hard, soft/soft), only the results showing the sliding of the hard rubber on the soft rubber will be presented and discussed. The friction between a hard rubber slider and a soft rubber track best resembles the conditions encountered in a flat tire. The results of friction coefficient measurements between the non-lubricated rubber surfaces are shown in Table VIII.

TABLE VIII

NON-LUBRICATED FRICTION
Sliding Friction Coefficient Between
Hard and Soft Rubbers (Modified Brabender)

| Sliding Speed cm/sec. | Normal Load kg | Friction Coefficient (Modified Brabender) |
|---|---|---|
| 0.85 | 15.3 | 1.40 |
| 0.85 | 19.5 | 1.18 |
| 0.85 | 24.4 | 0.91 |
| 2.115 | 15.3 | 1.21 |
| 2.115 | 19.5 | 1.08 |
| 2.115 | 24.4 | 0.92 |

All tests were run at room temperature.

In the absence of a lubricant, sliding between rubbers resulted in an abrupt rise in temperature of the rubbers, regardless of the load applied. This leads to severe wear of the rubbers. In order to avoid complications arising from heat build-up and wear, all the test measurements were completed before noticeable heat build-up started to occur. This usually took less than 5 minutes. In most cases, an equilibrium torque would have been reached after two minutes of sliding. The phenomenon of stick-slip was prevalent in all cases.

Figure 2:
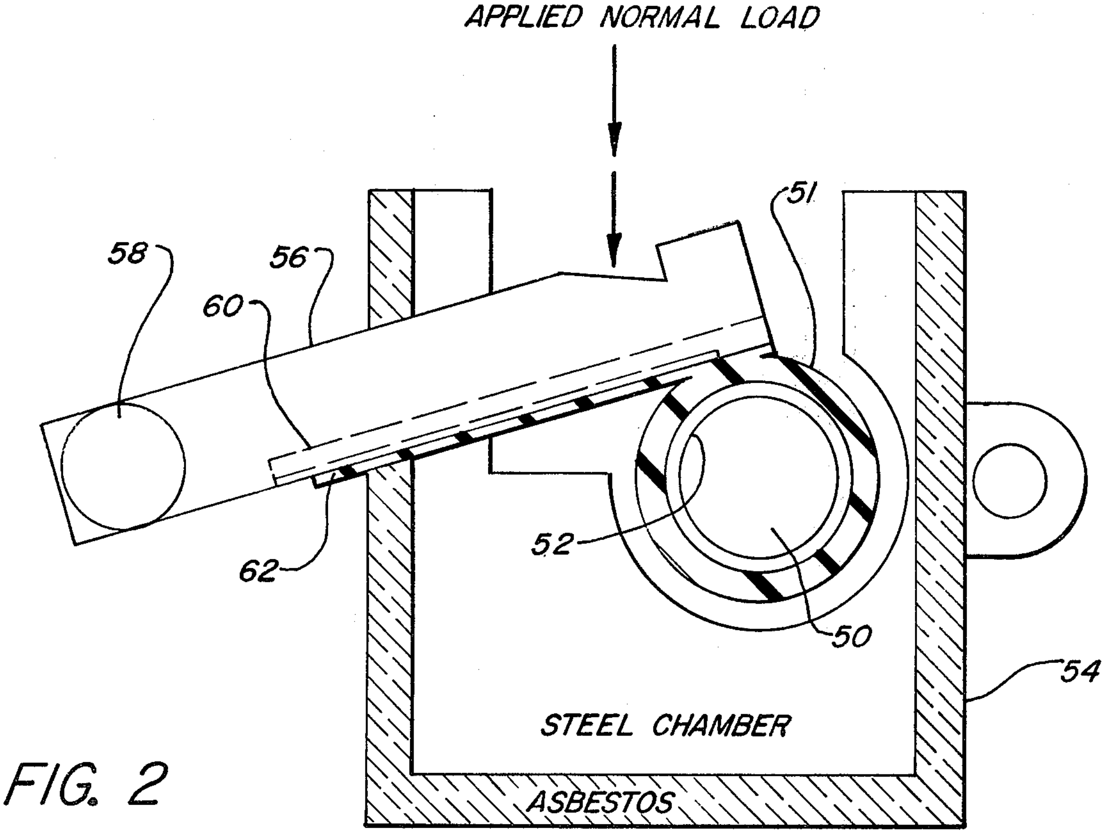
FIG. 2 is a sectional view of a test device to measure friction and temperature rise.

The friction torque was taken as the average of the minimum and maximum values over the entire time scale. This averaging technique is valid as long as sliding speed is greater than 1 cm/sec. Results obtained this way are reproducible to within 15%. As expected, the friction force is not directly proportional to normal load. There is a pronounced non-linearity especially at the low load range. In another experiment involving hard rubber sliding on the soft rubber at 11 cm/sec. at 70° C., the coefficient of friction decreases from 3.1 at about 1 kg normal load to 0.9 to about 18.2 kg load. Reference to FIG. 2 shows the actual normal load is related to the apparent normal load by a factor of Cos $\Theta$. For a given applied normal load, frictional force and coefficient decrease with increasing temperature and speed. The results for the temperature effect are somewhat scattered.

LUBRICATED FRICTION

The friction coefficient increases with normal load in the lubricated case. At increasing load, the lubricant film is probably partially squeezed out so that direct contact between rubbers and, hence increasing friction coefficient occurred.

The friction coefficient between the hard and the soft rubbers using various lubricants is summarized in Table IX. All measurements were done under the following conditions.

Temperature = 100° C.
Sliding Speed = 20 cm/sec.
Normal load = 19.5 kg

TABLE IX

COEFFICIENT OF SLIDING FRICTION
BETWEEN RUBBERS

| Lubricant | Friction Force (Newtons) | Friction Coefficient |
|---|---|---|
| None | 119.1 | 0.65 |
| II | 10.6 | 0.056 |
| III | 9.8 | 0.051 |
| IV | 10.0 | 0.054 |
| V | 11.0 | 0.056 |
| VI | 10.6 | 0.056 |

The results show the effectiveness of the polyester-based lubricants in reducing sliding friction between rubbers. A tenfold reduction in friction coefficient is observed in all the lubricants examined.

Network gels having melting points ranging from 70° C. to 170° C. have been developed. Examples of various network lubricants having a range of melting points are shown in Table X. The lower melting gels are generally slightly tacky on touching while the higher melting gels are stiff and rubbery. Most of the gels started to soften at some temperature which is quite distant from the melting temperature.

TABLE X

EXAMPLES OF NETWORK LUBRICANTS

| Lubricant (Examples) | VII | VIII | IX | X | XI |
|---|---|---|---|---|---|
| Adiprene LW510 | 100 | 100 | 100 | 100 | 100 |
| Polyglycol P4000 | 105 | — | 71.2 | — | 102 |
| Polyglycol P2000 | 55 | — | 36.8 | 95.6 | 52.8 |
| Voranol 3000 | — | 100 | — | — | — |
| Propylene glycol | — | — | 1.3 | — | — |
| DC203 | — | 5.0 | — | — | — |
| X2-3107 | 5.0 | — | 2.5 | 2.0 | 2.5 |
| CAB-O-SIL fumed silica #M5 | — | — | — | — | 25.0 |
| Ionol | 0.5 | 0.2 | 0.5 | 0.5 | 0.5 |
| T-12 | 0.2 | 0.2 | 0.2 | 0.2 | 0.2 |
| BD/TP440 (95/5) | — | 4.24 | — | — | — |
| Totals | 265.7 | 209.64 | 212.5 | 198.3 | 283.0 |
| Approx. Liquifying Temp. | 85 | 110 | 120 | 175 | 220 |

The materials used are:

Voranol 3000: a trifunctional polypropylene glycol (Dow Chemical).

DC 203: a silicone based material used for flow modification (Dow Corning).

BD/TP 440 (95/5): stands for a mixture of butanediol and Pluracol TP 440 (95:5 weight ratio). Pluracol TP 440 (BASF Wyandotte) is a trifunctional polyol.

I claim:

1. A pneumatic tire having an interior surface mounted on a rim to define an inflation chamber, the rim having means to prevent the tire beads from becoming dislodged from the rim when the tire is operated in a deflated condition, wherein the improvement comprises:

a solid coating matrix on the interior surface of the tire selected from the group consisting of polyesters, polyureas, and polyurethanes which coating matrix does not begin to flow on the surface of the tire and adversely effect the balance of the tire until the heat generated by the tire running flat causes the tire to reach a temperature of between 65 degrees C. and 150 degrees C. and liquify the matrix.

2. The tire of claim 1 wherein the coating matrix does not begin to flow until the tire reaches a temperature of from 80° C. to 120° C.

3. The tire of claim 2 wherein the coating matrix is a polyurethane.

4. The tire of claim 2 wherein the coating matrix is a polyester.

* * * * *